Patented Nov. 20, 1934

1,981,426

UNITED STATES PATENT OFFICE

1,981,426

LIQUID HARDENER SOLUTIONS

Lowell E. Muehler, Rochester, N. Y., assignor to Eastman Kodak Company, Rochester, N. Y., a corporation of New York No Drawing. Application April 18, 1933,
Serial No. 666,733

10 Claims. (Cl. 95—88)

The present invention relates to liquid hardener solutions which are compounded with hypo or sodium thiosulfate solutions to make acid hardening fixing baths for photographic processes.

It has long been recognized that the addition of a hardener to an acid fixing bath will harden the gelatin of the photographic emulsion to prevent frilling and softening thereof. However, the previously known hardeners are objectionable in that the solutions are subject to incrustation, crystallization, or freezing at low temperatures. Furthermore, the resultant acid hardening fixing baths have a relatively low sulfurization life and low sludging life.

The alums, especially potassium alum, have been widely used as hardeners but are open to the objections above enumerated.

An object of the present invention is the provision of a liquid hardener solution which is very economical because the solution is concentrated and only a relatively small proportion is required to produce an acid hardening fixing bath with adequate hardening properties.

Another object of the present invention is the provision of a liquid hardener solution which is free from danger of incrustation, crystallization or freezing at low temperatures, although the solution has such a concentration that only small quantities need be added to hypo or thiosulfate solutions to form a very satisfactory acid hardening fixing bath for photographic processing.

The aforementioned objects of the invention are attained by the inclusion in the hardening solution of a simple salt of aluminum which has a relatively high solubility at low temperatures.

I have found that compounds, such as aluminum chloride or double salts such as aluminum alkali chloride, are particularly suitable for the preparation of such concentrated hardener solutions.

The hardener solutions containing aluminum chloride or aluminum alkali chloride may be prepared either with or without the addition of organic hydroxy acids or alkali salts of such acids, for the purpose of inhibiting the precipitation of basic aluminum compounds either in the hardener solution or in the acid fixing bath compounded with the hardener.

Representative examples of hardener solutions employing aluminum chloride are given as follows:

Example A

| | |
|---|---|
| Sodium sulfite (desiccated) | 120 grams |
| Acetic acid (glacial) | 105 cc. |
| Aluminum chloride (crystal) | 150 grams |
| Water to make | 1 liter |

Example B

| | |
|---|---|
| Sodium potassium tartrate | 52 grams |
| Sodium sulfite (desiccated) | 225 grams |
| Acetic acid (glacial) | 200 cc. |
| Aluminum chloride (crystal) | 115 grams |
| Water to make | 1 liter |

The liquid hardener solutions of the present invention do not form an incrustation on the walls of the container after standing, and do not deposit crystals at temperatures as low as 0° F.

All equivalents and modifications, which come within the scope of the appended claims, are considered to be within the purview of the invention.

What I claim is:

1. A liquid hardener for use with a solution of sodium thiosulfate to make an acid hardening fixing bath, which comprises aluminum chloride, and sodium sulfite.

2. A liquid hardener for use with a solution of sodium thiosulfate to make an acid hardening fixing bath, which comprises sodium sulfite and an aluminum alkali chloride.

3. A liquid hardener for use with a solution of sodium thiosulfate to make an acid hardening fixing bath, which comprises aluminum chloride, sodium sulfite, and an organic hydroxy acid.

4. A liquid hardener for use with a solution of sodium thiosulfate to make an acid hardening fixing bath, which comprises aluminum chloride, acetic acid and sodium sulfite.

5. A liquid hardener for use with a solution of sodium thiosulfate to make an acid hardening fixing bath, which comprises aluminum chloride, sodium sulfite, and an alkali salt of an organic hydroxy acid.

6. A liquid hardener for use with a solution of sodium thiosulfate to make an acid hardening fixing bath, which comprises aluminum chloride, sodium sulfite, acetic acid, and an alkali salt of an organic hydroxy acid.

7. A liquid hardener for use with a solution of sodium thiosulfate to make an acid hardening fixing bath, which comprises aluminum chloride, sodium sulfite, and sodium potassium tartrate.

8. A liquid hardener for use with a solution of sodium thiosulfate to make an acid hardening fixing bath, which comprises aluminum chloride, sodium sulfite, acetic acid, and sodium potassium tartrate.

9. An acid hardening fixing bath which comprises sodium thiosulfate, sodium sulfite and aluminum chloride.

10. An acid hardening fixing bath which comprises sodium thiosulfate, aluminum chloride, sodium sulfite and an organic acid.

LOWELL E. MUEHLER.